(12) United States Patent
Karlík et al.

(10) Patent No.: US 10,984,584 B1
(45) Date of Patent: Apr. 20, 2021

(54) RENDERING IMAGES USING MODIFIED MULTIPLE IMPORTANCE SAMPLING

(71) Applicant: Chaos Software Ltd., Sofia (BG)

(72) Inventors: Ondřej Karlík, Přestavlky (CZ); Martin Šik, Prague (CZ); Petr Vévoda, Slavičín (CZ); Tomáš Skřivan, Prague (CZ); Jaroslav Křivánek, Prague (CZ)

(73) Assignee: Chaos Software Ltd., Sofia (BG)

( * ) Notice: Subject to any disclaimer, the term of this patent is extended or adjusted under 35 U.S.C. 154(b) by 0 days.

(21) Appl. No.: 16/679,075

(22) Filed: Nov. 8, 2019

(51) Int. Cl.
*G06T 15/50* (2011.01)
*G06T 15/06* (2011.01)

(52) U.S. Cl.
CPC ............ *G06T 15/506* (2013.01); *G06T 15/06* (2013.01); *G06T 2210/61* (2013.01)

(58) Field of Classification Search
None
See application file for complete search history.

(56) References Cited

U.S. PATENT DOCUMENTS

| | | | | |
|---|---|---|---|---|
| 9,703,756 | B2 * | 7/2017 | Jarosz | ............ G06T 19/00 |
| 2015/0042652 | A1 * | 2/2015 | Keller | ............ G06T 15/506 345/426 |
| 2016/0314614 | A1 * | 10/2016 | Bitterli | ............ G06T 15/80 |
| 2017/0236322 | A1 * | 8/2017 | Catalano | ............ G06T 15/06 345/426 |
| 2018/0197327 | A1 * | 7/2018 | Sun | ............ G06T 15/506 |
| 2019/0139295 | A1 * | 5/2019 | Nov K | ............ G06F 30/00 |

OTHER PUBLICATIONS

Eric Veach and Leonidas J. Guibas, "Optimally Combining Sampling Techniques for Monte Carlo Rendering," SIGGRAPH '95 Proceedings (Aug. 1995), Addison-Wesley, pp. 419-428.

* cited by examiner

*Primary Examiner* — Jeffrey J Chow
(74) *Attorney, Agent, or Firm* — Fish & Richardson P.C.

(57) ABSTRACT

Methods, systems, and apparatus, including computer programs encoded on computer storage media, for image rendering. One of the methods includes receiving data describing a scene, wherein the scene comprises one or more light sources and one or more objects having different surface optical properties; receiving a request to render an image of the scene using a multiple importance sampling method that combines a plurality of sampling techniques, wherein each sampling technique uses a different probability distribution to sample a respective fraction of total number of samples; modifying a particular one of the probability distributions to reduce a variance of the multiple importance sampling while holding the respective fractions and the other probability distributions fixed; rendering the scene using the multiple importance sampling using the modified particular probability distribution and the other probability distributions; and outputting the rendered scene in response to the request.

18 Claims, 3 Drawing Sheets

US 10,984,584 B1

RENDERING IMAGES USING MODIFIED MULTIPLE IMPORTANCE SAMPLING

BACKGROUND

This specification relates to sampling techniques in image rendering that reduce sample result variance.

A common task in computer graphics is to render an image of a scene. This task is equivalent to determining a value for each pixel in the image, which in turn depends on solving a rendering equation representative of the scene. The rendering equation is an integral equation describing the amount of radiance towards any direction at any spatial point in the scene. However, due to its complex form, the rendering equation often has no closed-form solution. As a result, solving the rendering equation, i.e., rendering the image of the scene, is typically computed numerically using Monte Carlo methods.

Conventional Monte Carlo methods use repeated random sampling to approximate a solution to the rendering equation by expressing the integral as an expected value of random variables. Each sampling technique selects samples according to a unique probability distribution.

In some cases, a method called multiple importance sampling (MIS) can be used to combine different sampling techniques. However, combining sampling techniques with MIS can produce an overly defensive estimator that leads to unnecessarily high variance, i.e., noise, in the rendered image.

SUMMARY

This specification describes modifications to conventional MIS. In general, the MIS framework represents a family of estimators, parametrized by weighting functions used to combine samples from different sampling techniques. Departing from the conventional MIS framework provides potential for estimator variance reduction. When compared to the images rendered using conventional MIS, those that are rendered as described in this specification show reduced variance. Like conventional MIS, the invention employs a combination of several sampling techniques, but unlike conventional MIS, the probability density function (pdf) of one of the sampling techniques is allowed to take any shape. Subsequently, an analytic expression is found for the pdf of the free technique that minimizes variance of the resulting estimator.

In general, one innovative aspect of the subject matter described in this specification can be embodied in methods for rendering an image of a scene using an improved sampling technique that include the actions of receiving data describing a scene, wherein the scene comprises one or more light sources and one or more objects having different surface optical properties; receiving a request to render an image of the scene using a multiple importance sampling method that combines a plurality of sampling techniques, wherein each sampling technique uses a different probability distribution to sample a respective fraction of total number of samples; modifying a particular one of the probability distributions to reduce a variance of the multiple importance sampling while holding the respective fractions and the other probability distributions fixed; rendering the scene using the multiple importance sampling using the modified particular probability distribution and the other probability distributions; and outputting the rendered scene in response to the request.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Other embodiments of this aspect can include one or more of the following optional features. The probability assigned to a given sample by the modified particular probability distribution is dependent on a difference between (i) a first value that is proportional to a contribution of the given sample to a rendering result and (ii) a second value that is a weighted sum of the probabilities assigned to the given sample by the other probability distributions. Each probability in the weighted sum is weighted by the respective sample count fraction for the corresponding other probability distribution. When the difference is greater than zero, the probability assigned to the given sample is the difference divided by the sample count fraction for the modified particular probability distribution and a normalization factor. When the difference is not greater than zero, the probability assigned to the given sample is zero.

The subject matter described in this specification can be implemented in particular embodiments so as to realize one or more of the following advantages. Images of scenes can be rendered with a high degree of visual realism while reducing the computational cost of image rendering. Rendering images can be performed more efficiently by selecting and combining in a specific manner various sampling techniques. As another advantage, the estimator variance of the improved version of MIS described in this specification can be reduced compared to the estimator variance of conventional MIS. The improvements to MIS described in this specification are simple to implement using one or more computing devices. The output can only decrease the variance, not increase it. The implementation can have little computation and memory overhead. Furthermore, the overall output can provide at least a same rendering quality of conventional MIS faster and with reduced computational effort.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
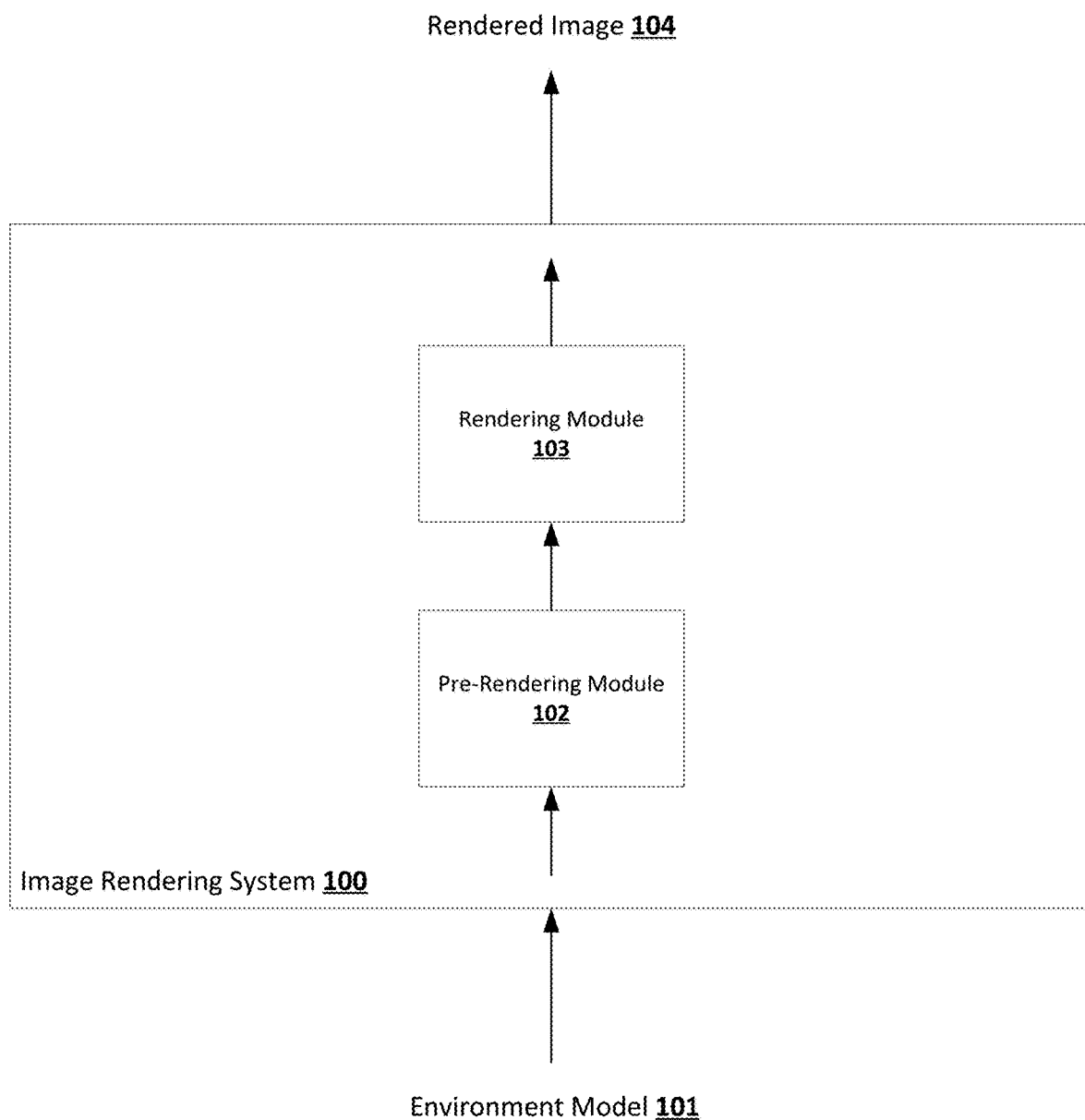
FIG. 1 is a block diagram of an example image rendering system.

FIG. 1 is a block diagram of an example image rendering system 100. The image rendering system 100 is an example system of one or more computers in one or more locations that is capable of producing a rendered image 104 of a scene given a view point and an image plane, where the scene is a three-dimensional environment that includes one or more reflective and scattering surfaces and is affected by one or more light sources.

The image rendering system 100 obtains as input an environment model 101 and analyzes the environment model 101 to generate the rendered image 104 of the scene. The environment model 101 can include data describing the position, orientation, shape, or optical properties of various objects in the scene. The environment model 101 can also include information about a view point and an image plane, such as the position of the view point, the position of the image plane, the orientation of the image plane, the size of the image plane, the resolution of the rendered image, etc.

The image rendering system 100 includes a pre-rendering module 102 and a rendering module 103. The pre-rendering module 102 optimizes the rendering process by preprocessing the environment model 101. In some implementations, the pre-rendering module 102 can preprocess the scene to improve the sampling process performed by the rendering module 103. For example, the pre-rendering module 102 can divide the scene into different regions based on one or more optical properties of the different regions, and recommend sampling techniques optimized for each region to the rendering module 103.

The rendering module 103 renders an image representing the environment model 101. During the rendering process, the rendering module 103 can support a variety of rendering techniques to determine a value for each of the pixels on the rendered image 104. Examples of rendering techniques include image-centric ray tracing and rasterization. For example, to implement ray tracing, the rendering module 103 can cast multiple rays from the view point (viewing rays). The viewing rays go through pixels on the image plane and intersect points in the scene. If the points belong to a light source, the light source can directly contribute a value to the corresponding pixel on the rendered image. If the points belong to a non-light-emitting object, then the viewing rays can be reflected or scattered in one or more directions to reach a light source to contribute a pixel value. The number and the direction of the reflected/scattered rays depend on the specific optical properties and geometry of the points. For example, if the points are located on a scattering surface, multiple outgoing directions can be analyzed as the surface uniformly diffuses an incident ray. Each of the reflected or scattered rays can reach a light source that contributes to a pixel value corresponding to the original ray. In another example, the reflected/scattered rays can reach another non-light-emitting object that causes an additional reflection/scattering.

When scenes include complex lighting conditions and/or material surface models, tracing rays from all point in the scene can have high computational cost. To reduce the computational cost associated with rendering, the rendering module 103 samples rays, for example, from points in the scene to the light sources affecting the scene. That is, the rendering module 103 selects a set of surface points and/or a set of directions in the scene to estimate pixel values of the rendered image.

To sample rays, the rendering module 103 employs one or more sampling techniques. Two common sampling techniques used to evaluate lighting at a point on a surface include sampling the light source and sampling a bidirectional reflectance distribution function (BRDF). Sampling the light source can refer various types of light sources including, for example a point source, spherical source, rectangular source, etc. or, as described in more detail below, sampling a high dynamic range (HDR) map applied to a model of a scene.

The BRDF describes how light is reflected/scattered off a surface as a function of the direction of a ray incident on the surface. When a viewing ray is incident on a glossy surface a significant portion of the viewing ray is reflected in a single direction according to the law of reflection, which states that the angle of an incident ray is equal to the angle of a reflected ray. As a result, for efficient sampling purposes, the BRDF sampling technique can randomly select directions of the reflected or outgoing ray at surface points according to a probability distribution similar to that of the bidirectional reflectance distribution function. That is to say, the sampling technique randomly samples outgoing ray directions at the incident point of an incoming ray, with each particular direction having a probability of being sampled equal to the ratio of the light reflected in the particular direction to the amount of light incident on the surface from the incoming ray direction. When instead a ray is incident on a rough scattering surface, the outgoing rays can be scattered uniformly in all directions. As a result, it is more efficient to sample surface points on a light source than to sample outgoing ray directions at incident points in a scene. For example, the surface points on the light source can be sampled according to a uniform distribution.

If a scene includes surfaces with different optical properties, e.g. both glossy reflective surfaces and rough scattering surfaces, a single sampling technique may be insufficient to sample the scene. As a result, multiple sampling techniques may be used, each suitable for rendering a different region of a scene. By combining the sampling techniques using MIS, a low noise level can be achieved across the entire rendered image.

When the rendering module 103 employs multiple sampling techniques, multiple importance sampling provides a simple yet robust means for combining the sampling techniques with provable variance bounds.

Consider an integral $F=\int_X f(x)d\mu(x)$ of a non-negative function $f(x)$. An unbiased Monte Carlo estimator $\langle F \rangle$ for the integral can be constructed by taking n random variables (samples) $X_i$, i=1, ..., n generated by a sampling technique with the pdf $p(x)$, and setting the estimator $$\langle F \rangle = \frac{1}{n} \sum_{i=1}^{n} \frac{f(X_i)}{p(X_i)}.$$

Variance estimator depends on the number of samples and on how 'similar' the pdf $p(x)$ is to the integrand $f(x)$. Whenever p is exactly proportional to $f$ up to a normalization constant, i.e., $p(x)=f(x)/F$, the variance is zero.

Finding a single pdf that closely approximates $f$ under all circumstances may be difficult, but there may be multiple sampling techniques, $t \in T$, with pdfs $p_t(x)$, each of which approximates some important feature of $f$, e.g., bidirectional reflectance distribution function (BRDF) sampling or high dynamic range (HDR) map sampling.

Multiple importance sampling (MIS) provides a general framework for constructing a combined estimator given multiple sampling techniques. Suppose there are $n_t=c_t*n$ independent samples from each technique, where $c_t$ denotes the respective fractions of the total sample count and each ith independent sample is denoted $X_{t,i}$. The multi-sample combined estimator then reads:

$$\langle F \rangle_{MS} = \sum_{t \in T} \frac{1}{n_t} \sum_{i=1}^{n_t} w_t(X_{t,i}) \frac{f(X_{t,i})}{p_t(X_{t,i})} \qquad \text{(equation 1)}$$

where the first summation is over the multiple sampling techniques and the second summation is over the independent samples, and where the weighting functions $w_t(x)$ provide a degree of freedom that can be used to optimize the estimator's variance.

Thus, the image rendering system can optimize the combination of the different sampling techniques by adjusting the weighting functions, e.g., by adjusting the contribution of the different sampling techniques for different regions of the rendered image, such as different portions of object surfaces. In this way, the weighting functions provide a degree of freedom that can be used to optimize the MIS estimator's variance. In some implementations, the balance heuristic is used for $w_t(x)$, which is described in greater detail below.

The equation for balance heuristic is:

$$w_t(x) = \frac{c_t p_t(x)}{\sum_{t' \in T} c_{t'} p_{t'}(x)} \qquad \text{(equation 2)}$$

Where $c_t$ is the respective fraction of the total sample count for the sampling technique t in the set of sampling techniques, $T$, and $p_t(x)$ is the pdf of the sampling technique t. The prime symbol in the denominator indicates that the sum in the denominator goes over all sampling techniques (including t) while the numerator uses just the individual sampling technique t corresponding to the weight.

Combining the balance heuristic with the general MIS estimator of equation 1 yields a combined estimator in the form:

$$\langle F \rangle_{MS} = \frac{1}{n} \sum_{t \in T} \sum_{i=1}^{n_t} \frac{f(X_{t,i})}{p_{eff}(X_{t,i})} \qquad \text{(equation 3)}$$

Where $p_{eff}(x)$ equals $\Sigma_{t' \in T} c_{t'} p_{t'}(x)$ from the balance heuristic denominator in equation 2 above. This combined estimator shows that the use of the balance heuristic effectively corresponds to a regular Monte Carlo estimator with samples drawn from a $p_{eff}(x)$, i.e., a weighted average of pdfs of the sampling techniques.

While the balance heuristic generally results in a low variance MIS estimator in a global sense, when applied to a particular fixed set of sampling techniques it may not result in a good estimator. Since the balance heuristic effectively averages pdfs of the combined sampling techniques, it can cause high-value areas to be undersampled and low-value areas to be oversampled.

However, the estimator variance can be reduced by optimizing one of the sampling techniques to effectively "sharpen" its pdf to compensate for the effect of pdf averaging induced by the balance heuristic.

For an MIS combination of a given set $T$ of sampling techniques $t \in T$ with sample fractions $c_t > 0$, one of the sampling techniques can be designated as "free." The objective of the modified MIS is to find a pdf for sampling technique τ: $p_\tau(x)$, that will minimize variance of the combined estimator with the balance heuristic shown above in equation 3. That is, to reduce the estimator's variance, the system optimizes one of the sampling techniques.

In an ideal case, the MIS estimator from equation 3 would have zero variance. For this to happen, the mixture density $p_{eff}(x)$ has to be exactly proportional to the integrand $$f(x), \text{ i.e., } P_{eff}(x) = \frac{f(x)}{F}.$$

Assuming the balance heuristic, it holds that $p_{eff}(x) = q(x) + c_\tau p_\tau(x)$, where there are separated pdfs of all the fixed sampling techniques under a single term $q(x) = \Sigma_{t' \in T} c_{t'} p_{t'}(x)$.

This can be algebraically solved for the pdf as:

$$p_\tau(x) = \frac{f(x)}{c_\tau F} - \frac{q(x)}{c_\tau} \qquad \text{(equation 4)}$$

However, to make the resulting pdf valid, the negative values can be clamped and the equation renormalized to obtain the optimized pdf for the modified MIS as:

$$\tilde{p}_\tau(x) = \frac{1}{b} \max\{0, p_\tau(x)\} \qquad \text{(equation 5)}$$

Figure 2:
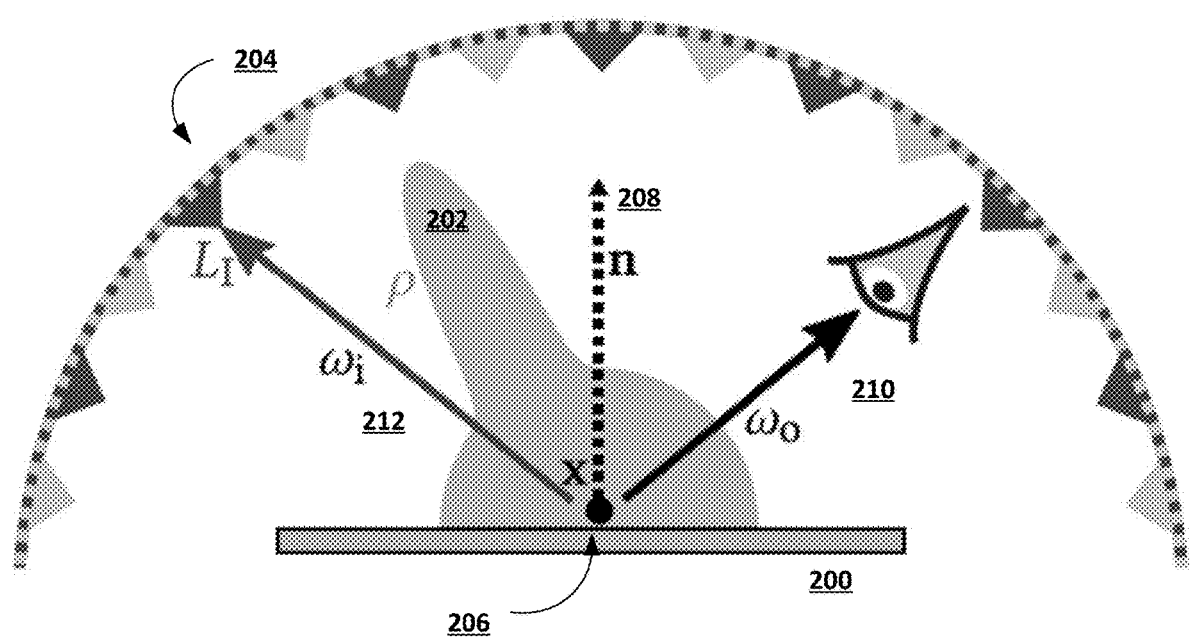
FIG. 2 illustrates an operational example of ray tracing with a sampling technique.
Figure 3:
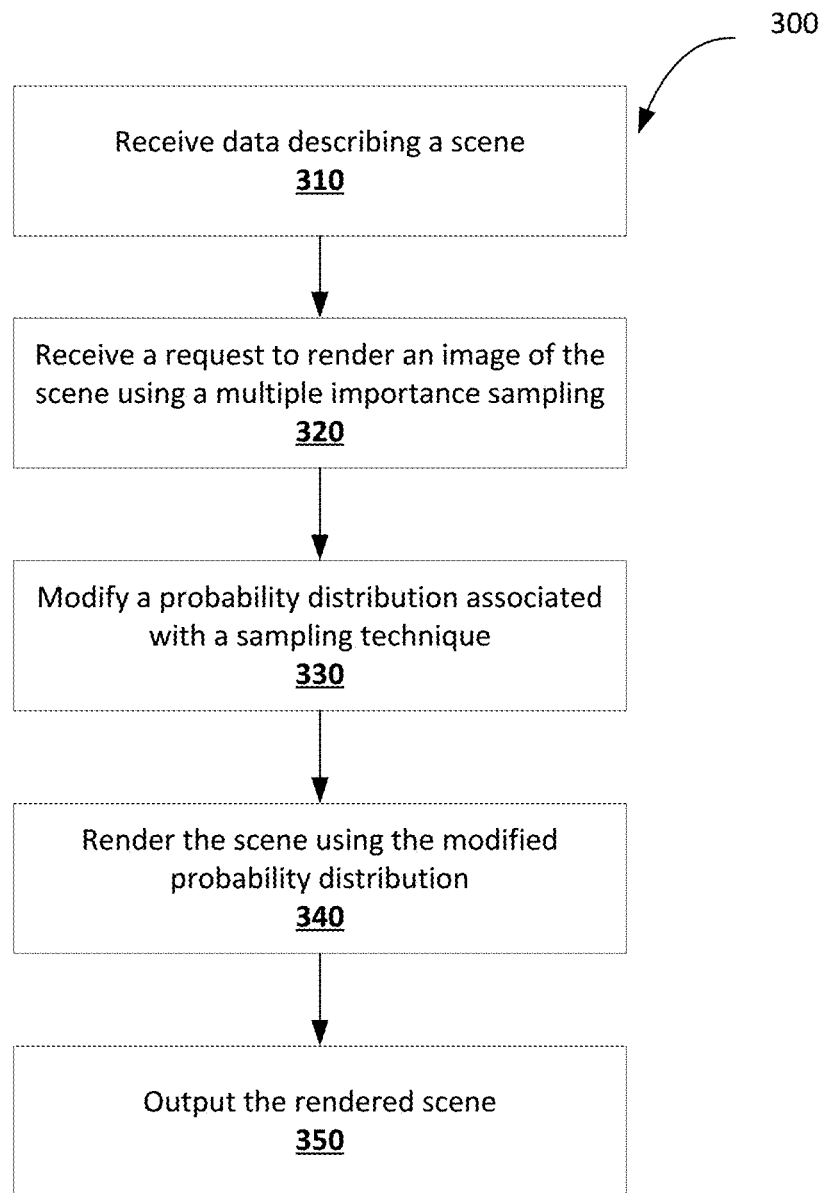
FIG. 3 is a flow diagram of an example process for rendering an image of a scene using modified MIS.

The pdf of equation 5 provides a generalized formula for a modified pdf that can be applied to any MIS estimator even outside of the context of image rendering. FIGS. 2 and 3, below, describe an application of this general result to the specific context of image-based lighting in image rendering systems.

FIG. 2 illustrates an example of image-based lighting. Image-based lighting concerns the computation of illumination due to a high-dynamic-range (HDR) environment map on a surface with an arbitrary BRDF. The HDR environment map can correspond, for example, to an omni-directional capture of real-world illumination that is projected on to a hemisphere relative to the surface being lit. An image rendering system, e.g., the image rendering system 100 of FIG. 1, can be used to compute the illumination of a scene based on the HDR environment map, for example, using MIS.

Specifically, FIG. 2 shows a surface 200 having an arbitrary BRDF 202. HDR map 204 can be used to determine the illumination on a point x 206 on the surface from a particular angle. The surface has a normal n, 208.

The reflected radiance of point x on the surface 200 due to direct illumination from the HDR map is calculated as:

$$L_{dir}(x,\omega_o) = \int_{\mathcal{H}(n)} L_I(\omega_i) \rho(x, \omega_o, \omega_i) |\omega_i \cdot n|_+ d\omega_i \qquad \text{(equation 6)}$$

In equation 6, x is the position on the surface, n is the surface normal at x. $\omega_o$ is the outgoing view direction shown by ray 210 in FIG. 2. $\mathcal{H}(n)$ is the hemisphere centered on the surface normal n. The HDR map emission coming from direction $\omega_i$ is given by $L_I(\omega_i)$, which is illustrated by ray 212 in FIG. 2. Variable ρ denotes the surface BRDF and $|\omega_i \cdot n|_+$ the positive part of the cosine of the angle between $\omega_i$ and n.

A Monte Carlo estimation of the direct illumination from the HDR map, $L_{dir}(x, \omega_o)$, typically relies on two sampling techniques that use random sampling to find approximate solutions to the radiance. The first sampling technique involves sampling of the HDR map while the second sampling technique involves sampling of the product of the BRDF and cosine $|\omega_i \cdot n|_+$. MIS can then be used to combine the sampling techniques.

Sampling from the HDR map, e.g., map 204, is usually implemented using a tabulated probability density function (pdf) $p_I(\omega_i)$. By contrast, sampling the cosine product of the BRDF is an analytical formula derived from a pdf $p_\rho(\omega_i|\omega_o, x)$, which generally depends on the outgoing direction and surface position.

An image rendering system can then render the surface 200 using MIS by combining results produced by the two sampling techniques to generate the reflected radiance of points on the surface 200. Moreover, as will be described in greater detail below with respect to FIG. 3, optimizing one of these sampling techniques can be used to reduce estimator variance from the estimator result of conventional MIS.

FIG. 3 is a flow diagram of an example process 300 for rendering an image of a scene having image-based lighting using a modified multiple importance sampling. For convenience, the process 300 will be described as being performed by a system of one or more computers, located in one or more locations, and programmed appropriately in accordance with this specification. For example, an image rendering system, e.g., the image rendering system 100 of FIG. 1, appropriately programmed, can perform the process 300.

The system receives data describing a scene (310). The scene can include one or more objects, which can have different surface optical properties, as well as data describing image-based illumination, for example, an HDR map of image-based illumination. The object data can describe, for example, the position, orientation, shape, or optical properties of the one or more objects. The data describing the scene may be a complete set of data, i.e., it includes all the necessary information for the system to render a visually realistic image of the scene. As an example, the scene can be the scene represented by surface 200 of FIG. 2.

The data can also describe the amount of light, i.e., radiance, emitted from various points in the scene along a particular viewing direction. The outgoing radiance, i.e., the radiance leaving a point in any direction in the scene, is a sum of emitted radiance (radiance emitted from the point, e.g., if the point lies on the surface of a light source) and reflected radiance (radiance reflected from the point). This relation can be captured by the rendering equation as:

$$L_{out}(x,\omega_0)=L_{emit}(x,\omega_0)+L_{reflected}(x,\omega_0) \quad \text{(equation 7)}$$

This rendering equation gives the amount of radiance leaving a point in the scene (as described by the vector x) in a specific direction (as described by the angle $\omega_0$). The data describing the scene specifies all the parameters included in the rendering equation. In particular, it is important to note that $L_{reflected}$ in equation 7 corresponds to $L_{dir}+L_{indir}$, where $L_{dir}$ is given by equation 6 and corresponds to the value improved by the modified MIS. $L_{indir}$ is typically solved recursively by tracing a reflected ray and computing equation 7 at a point where the reflected ray hits the scene being rendered.

The system receives a request to render an image of the scene using a multiple importance sampling (320). n total samples can be sampled in the scene using a specified number of sampling techniques with different probability distributions, each used to sample a respective fraction of the n total samples.

For example, the image can be an image taken from the perspective of a specified view point in a specified image plane. The system can render the image by image-centric ray tracing, i.e., tracing the path of light through pixels in the image plane and simulating the effects of its encounters with objects in the scene. Rendering an image is equivalent to solving the associated rendering equation and obtaining a function that describes how a ray interacts with the one or more objects in the scene. However, the term $L_{reflected}(x, \omega_0)$ involves a complex integral, resulting in the rendering equation often having no closed-form solution. To approximate a solution, the rendering equation can be evaluated numerically using Monte Carlo estimation that relies on multiple sampling techniques. These sampling techniques can then be combined using MIS. As noted above, conventional MIS relies on different weighting functions for each sampling technique to fine-tune the contribution of each sampling technique. The MIS estimator variance therefore also depends on the weighting functions used.

Referring back to FIG. 2, the first sampling technique involves sampling of the HDR map describing the omnidirectional image-based illumination of the scene while the second sampling technique involves sampling of the product of the BRDF at points of the surface and $|\omega_i \cdot n|_+$.

Mathematically, each of the sampling techniques is associated with a probability distribution function. The probability distribution indicates the likelihood that a data point will be sampled. For example, a uniform probability distribution indicates that all data points are equally likely to get sampled.

The system modifies a probability distribution associated with one of the sampling techniques (330). In contrast to conventional MIS, the modified MIS described in this specification optimizes a pdf from one of the sampling techniques to reduce the estimator variance. In the above examples for image-based lighting, sampling from the HDR map is usually implemented using a tabulated pdf, which is typically simpler to modify than the pdf used to sample the BRDF-cosine product.

In particular, in some implementations, the system optimizes the tabulated probability density in a preprocess, the modification can be used in any renderer relying on MIS for HDR sampling without any modifications of the sampling routines themselves. That is, the optimization can be done before the sampling starts and does not rely on any adaptive updates to the system. Since the system merely modifies a tabulated pdf, it has no overhead and marginal impact on the time per sample.

To get the modified pdf $\tilde{p}_I$ for the image-based lighting scenario described in FIG. 2, the integrand from equation 6 and the BRDF sampling technique $p_\rho(\omega_i|\omega_O, x)$ is plugged into the generalized pdf solution of equation 5 above to obtain:

$$\tilde{p}_I(\omega_i \mid \omega_O, x) = \frac{1}{b}\max\left\{0, \frac{f(x, \omega_O, \omega_i)}{c_I L_{dir}(x, \omega_O)} - \frac{1-c_I}{c_I} p_\rho(\omega_i \mid \omega_O, x)\right\} \quad \text{(equation 8)}$$

where $c_I$ is the fraction of samples taken from the HDR map and $f_I(x, \omega_O, \omega_i)=L_I(\omega_i)\rho(x, \omega_O, \omega_i)|\omega_i \cdot n|_+$. The normalization factor b ensures that $\tilde{p}_I(\omega_i|\omega_O, x)$ integrates to one.

The modified tabulated pdf in equation 8 is difficult to apply in practice, because the pdf $\tilde{p}_I(\omega_i|\omega_O, x)$ depends on both $\omega_o$ and x, and the equation requires the system to tabulate the pdf for each view direction and surface position. However, a normal-dependent pdf (nd), which provides a practical approximation of the pdf of equation 8, can be derived by assuming Lambertian BRDFs with unit albedo, the fraction of incident light that is reflected by a surface, $$\rho \equiv \frac{1}{\pi},$$

as shown below:

$$p_I^{nd}(\omega_i \mid n) = \qquad \text{(equation 9)}$$

$$\frac{1}{b_{nd}} \max\left\{0, \frac{f_{nd}(\omega_i, n)}{c_I \int_{\mathcal{H}(n)} f_{nd}(\omega, n) d\omega} - \frac{1-c_I}{c_I} \frac{|\omega_i \cdot n|_+}{\pi}\right\}$$

where $f_{nd}(\omega_i, n) = L_I(\omega_i) \frac{|\omega_i \cdot n|_+}{\pi}$.

The resulting pdf now depends only on the surface normal n, and could be precomputed for a number of directions. To obtain a more convenient result that can be readily applied in existing renderers, the dependence on n is removed to generate a normal-independent pdf (ni) by averaging $p_I^{nd}(\omega_i \mid n)$ over all possible normal directions. This yields the practical modified probability distribution:

$$p_I^{ni}(\omega_i) = \frac{1}{b_{ni}} \max\{0, L_I(\omega_i) - 2(1-c_I)\overline{L}_I\} \qquad \text{(equation 10)}$$

where $\overline{L}_I$ is the mean HDR map luminance and $b_{ni}$ ensures that $p_I^{ni}(\omega_i)$ integrates to one.

The system renders the scene using the modified probability distribution (340). For example, the system can replace the free sampling technique with a modified sampling technique having the modified probability distribution described above. The system can combine the sampling techniques, including the modified sampling technique, using an appropriate weighting functions, e.g., using the balance heuristic. The improved multiple importance sampling that uses the modified sampling technique, has a reduced MIS estimator variance compared to a conventional MIS estimator.

The system outputs the rendered image (350). Once the system obtains a value for each pixel on the rendered image, the image can be converted to a suitable format and displayed. Examples of image data formats include JPEG, PNG, TIFF, SVG, CGM, FITS, etc.

While this disclosure discusses the application of an improved MIS to the field of computer graphics, in general, the improved MIS can be applied to a wide range of problems relying on MIS. For example, the modified MIS as described in this specification can be used in transport path guiding applications, freeflight sampling in heterogeneous media, or light sampling for direct or indirect illumination. All those approaches feature empirically constructed pdfs combined with a defensive technique that lend themselves to the modified MIS described in this specification.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving data describing a scene, wherein the scene comprises one or more light sources and one or more objects having different surface optical properties;
   receiving a request to render an image of the scene using a multiple importance sampling method that combines a plurality of sampling techniques, wherein each sampling technique uses a different probability distribution to sample a respective fraction of a total number of samples, wherein the total number of samples includes different fractions corresponding to different sampling techniques of the plurality of sampling techniques, wherein each sampling technique is suitable for rendering different regions of the scene, and wherein each sampling technique defines a different probability that a data point is to be sampled;
   modifying a particular one of the probability distributions corresponding to a particular sampling technique to reduce a variance of the multiple importance sampling while holding the respective fractions and the other probability distributions fixed;
   rendering the scene using the multiple importance sampling using the modified particular probability distribution and the other probability distributions; and
   outputting the rendered scene in response to the request.

2. The method of claim 1, wherein the probability assigned to a given sample by the modified particular probability distribution is dependent on a difference between (i) a first value that is proportional to a contribution of the given sample to a rendering result and (ii) a second value that is a weighted sum of the probabilities assigned to the given sample by the other probability distributions.

3. The method of claim 2, wherein each probability in the weighted sum is weighted by the respective sample count fraction for the corresponding other probability distribution.

4. The method of claim 2, wherein, when the difference is greater than zero, the probability assigned to the given sample is the difference divided by the sample count fraction for the modified particular probability distribution and a normalization factor.

5. The method of claim 2, wherein, when the difference is not greater than zero, the probability assigned to the given sample is zero.

6. The method of claim 1, wherein the plurality of sampling techniques evaluates lighting at a point on a surface.

7. A system comprising:
one or more computers and one or more storage devices storing instructions that are operable, when executed by the one or more computers, to cause the one or more computers to perform operations comprising:
receiving data describing a scene, wherein the scene comprises one or more light sources and one or more objects having different surface optical properties;
receiving a request to render an image of the scene using a multiple importance sampling method that combines a plurality of sampling techniques, wherein each sampling technique uses a different probability distribution to sample a respective fraction of a total number of samples, wherein the total number of samples includes fractions corresponding to different sampling techniques of the plurality of sampling techniques, wherein each sampling technique is suitable for rendering different regions of the scene, and wherein each sampling technique defines a different probability that a data point is to be sampled;
modifying a particular one of the probability distributions corresponding to a particular sampling technique to reduce a variance of the multiple importance sampling while holding the respective fractions and the other probability distributions fixed;
rendering the scene using the multiple importance sampling using the modified particular probability distribution and the other probability distributions; and
outputting the rendered scene in response to the request.

8. The system of claim 7, wherein the probability assigned to a given sample by the modified particular probability distribution is dependent on a difference between (i) a first value that is proportional to a contribution of the given sample to a rendering result and (ii) a second value that is a weighted sum of the probabilities assigned to the given sample by the other probability distributions.

9. The system of claim 8, wherein each probability in the weighted sum is weighted by the respective sample count fraction for the corresponding other probability distribution.

10. The system of claim 8, wherein, when the difference is greater than zero, the probability assigned to the given sample is the difference divided by the sample count fraction for the modified particular probability distribution and a normalization factor.

11. The system of claim 8, wherein, when the difference is not greater than zero, the probability assigned to the given sample is zero.

12. The system of claim 7, wherein the plurality of sampling techniques evaluates lighting at a point on a surface.

13. One or more non-transitory computer-readable storage media encoded with instructions that, when executed by one or more computers, cause the one or more computers to perform operations comprising:
receiving data describing a scene, wherein the scene comprises one or more light sources and one or more objects having different surface optical properties;
receiving a request to render an image of the scene using a multiple importance sampling method that combines a plurality of sampling techniques, wherein each sampling technique uses a different probability distribution to sample a respective fraction of a total number of samples, wherein the total number of samples includes fractions corresponding to different sampling techniques of the plurality of sampling techniques, wherein each sampling technique is suitable for rendering different regions of the scene, and wherein each sampling technique defines a different probability that a data point is to be sampled;
modifying a particular one of the probability distributions corresponding to a particular sampling technique to reduce a variance of the multiple importance sampling while holding the respective fractions and the other probability distributions fixed;
rendering the scene using the multiple importance sampling using the modified particular probability distribution and the other probability distributions; and
outputting the rendered scene in response to the request.

14. The computer-readable storage media of claim 13, wherein the probability assigned to a given sample by the modified particular probability distribution is dependent on a difference between (i) a first value that is proportional to a contribution of the given sample to a rendering result and (ii) a second value that is a weighted sum of the probabilities assigned to the given sample by the other probability distributions.

15. The computer-readable storage media of claim 14, wherein each probability in the weighted sum is weighted by the respective sample count fraction for the corresponding other probability distribution.

16. The computer-readable storage media of claim 14, wherein, when the difference is greater than zero, the probability assigned to the given sample is the difference divided by the sample count fraction for the modified particular probability distribution and a normalization factor.

17. The computer-readable storage media of claim 14, wherein, when the difference is not greater than zero, the probability assigned to the given sample is zero.

18. The computer-readable storage media of claim 13, wherein the plurality of sampling techniques evaluates lighting at a point on a surface.

* * * * *